(12) United States Patent (10) Patent No.: US 8,375,288 B1
Mayerson et al. (45) Date of Patent: Feb. 12, 2013

(54) METHOD AND SYSTEM FOR USER INPUT FACILITATION, ORGANIZATION, AND PRESENTATION

(75) Inventors: Neal Mayerson, Wyoming, OH (US); Deb Pinger, Bethel, OH (US)

(73) Assignee: Neal H. Mayerson, Cincinnati, OH (US)

( * ) Notice: Subject to any disclaimer, the term of this patent is extended or adjusted under 35 U.S.C. 154(b) by 889 days.

(21) Appl. No.: 12/459,707

(22) Filed: Jul. 7, 2009

Related U.S. Application Data

(60) Provisional application No. 61/129,625, filed on Jul. 7, 2008.

(51) Int. Cl.
*G06F 17/00* (2006.01)

(52) U.S. Cl. .......................... 715/212; 715/219; 715/220

(58) Field of Classification Search ........... 715/212–220
See application file for complete search history.

(56) References Cited

U.S. PATENT DOCUMENTS

| | | | |
|---|---|---|---|
| 5,563,994 A | 10/1996 | Harmon et al. | |
| 7,038,680 B2 | 5/2006 | Pitkow | |
| 7,426,688 B2 * | 9/2008 | Serra et al. | 715/212 |
| 7,693,860 B2 * | 4/2010 | Babanov et al. | 715/212 |
| 2002/0184260 A1 * | 12/2002 | Martin et al. | 707/503 |
| 2004/0085360 A1 * | 5/2004 | Pratt et al. | 345/773 |
| 2004/0163050 A1 * | 8/2004 | Matter | 715/530 |
| 2006/0116994 A1 | 6/2006 | Jonker et al. | |
| 2006/0117253 A1 * | 6/2006 | Polash | 715/517 |
| 2007/0130502 A1 * | 6/2007 | Tolgu et al. | 715/503 |
| 2007/0271502 A1 * | 11/2007 | Bedi et al. | 715/512 |
| 2009/0012842 A1 | 1/2009 | Srinivasan et al. | |
| 2009/0046100 A1 | 2/2009 | Evans | |
| 2010/0062796 A1 * | 3/2010 | Hayton et al. | 455/466 |

* cited by examiner

*Primary Examiner* — Chau Nguyen
(74) *Attorney, Agent, or Firm* — Frost Brown Todd LLC

(57) ABSTRACT

User input can be organized and presented using a multi-dimensional board comprising a plurality of cells where unique messages are displayed in individual cells in the board. In some cases the messages may be accompanied by path indicators indicating which messages on the board are responsive to which other messages. The messages can include text, video, audio, and/or various types of interactive media such as games or applets.

12 Claims, 12 Drawing Sheets

MYKU
W O R L D

Welcome, eric
(0) unread message(s)
Logout

What is MYKU World?

👤 My Profile

102

| | | |
|---|---|---|
| Hard Edges 💬<br>Hard Edges the taller you become<br>Cutting, poking me my son<br>Searching for your soft, gentle core<br>I'll wait here patiently at your 👤 | RE: cracked 💬<br>My daughter's cracked<br>But not broken<br>Her heart's intact<br>but unspoken<br><br>105 👤 | Unspeakable 💬<br>Hearts quietly beat<br>Myterious rhythms<br>Mostly misunderstood<br>By other who hear'm<br>103<br>👤 |
| RE: RE: cracked 💬<br>Like a speeding train<br>loud with such force<br>almost insane<br>driven by your course<br><br>107 ⟶ 👤 | RE: Hard Edges 💬<br>Remember when you held my hand<br>Independence was my stand<br>Learned my lessons of a man<br>Remembering when you held my hand 👤 | RE: RE: cracked 💬<br>whose heart's not it's<br>what comes next after we<br>hurt a lot do we do what's best<br><br>👤 |
| RE: RE: RE: cracked 💬<br>Coursing through my blood<br>Too hot to hold inside me<br>Addicted, Conflicted,<br>Hopelessly affilicted<br><br>👤 | | RE: RE: RE: cracked 💬<br>Wanna open it<br>After someone's broken it<br>Or crawl in a hole<br>And let the heart grow cold<br><br>👤 |
| RE: RE: RE: RE: cracked 💬<br>start hopeless<br>with no false expectations<br>but know this<br>it all comes with patience<br><br>👤 | 106 | RE: RE: RE: RE: cracked 💬<br>Cold blood bleeds slowly<br>But doesn't course through veins<br>Which life will you choose<br>One of vigor or one that drains ? 👤 |
| | | |

Report abuse to the site administrator. <u>Click here</u> to report abuse.

FIG. 2 art's intact
poken

Mostly misunderstood
By other who hear'm rd Edges
mber when you held my
ndence was my stand
d my lessons of a man
mbering when you held RE: Unspeakable
sometimes the best I can
do is to stand or sit and
wait for you
worldless worlds of love still
live
in the everyday things we RE: RE: cracked
whose heart's not it's
what comes next after
we hurt a lot do we do
what's best RE: RE: RE: cracked
Wanna open it
After someone's broken it
Or crawl in a hole
And let the heart grow cold RE: RE: RE: RE: cracked
Cold blood bleeds slowly
But doesn't course through
veins
Which life will you choose
One of vigor or one that
drains ?

Reply to the highlighted MyKu 201
202
203
204

MYKU
W O R L D

Compose your MyKu in the space below.

Subject:
RE: RE: RE: cracked

MyKu:
start hopeless
with no false expectations
but know this
it all comes with patience

— 301

Reflections:

Tag my MyKu:
Hope

Submit

Cancel

METHOD AND SYSTEM FOR USER INPUT FACILITATION, ORGANIZATION, AND PRESENTATION

CROSS REFERENCE TO RELATED APPLICATIONS

This applications claims priority to provisional application 61/129,625, filed on Jul. 7, 2008, the disclosure of which is hereby incorporated by reference in its entirety.

INCORPORATION BY REFERENCE

This application incorporates by reference in its entirety the information from the computer program listing appendix submitted herewith, comprising the files listed in the table below:

| Name | Size | Created |
| --- | --- | --- |
| Source File 1.txt | 46,432 bytes | 07/06/2009 |
| Source File 2.txt | 57,107 bytes | 07/06/2009 |
| MYKUWorld-Database-6.18.2008.sql | 98,820 bytes | 07/06/2009 | on the compact disc submitted herewith, and the computer program which is represented by their combination. Two identical discs, each containing the files listed above are submitted herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Existing methods of facilitating, organizing and presenting user input tend to utilize one dimensional (e.g., linear) interfaces which are poorly suited for managing ongoing interactions. For example, comment threads, which indicate responsive comments through features such as indenting, can quickly become overwhelming, as users create multiple threads with various levels of indenting through responding to existing interactions. Further, because of the one dimensional nature of these conventional approaches, following or participating in an ongoing interaction is complicated by the need to scroll through a (often sizeable) list of previous comments which may be of little or no interest.

As a result, there is a need for improved technology for facilitating, organizing, and presenting user input.

SUMMARY

Disclosed herein are techniques which could be implemented to facilitate, present and organize user input. For example, based on this disclosure, one of ordinary skill in the art could program a computer to perform a set of steps comprising displaying a board comprising a set of cells, displaying a set of messages, allowing a user to select a cell, allowing a user to add an element to the set of messages by entering a new message for the selected cell, and displaying a path indicator indicating relationships between responsive messages. Of course such a programmed computer is not the only potential type of implementation for the teachings of this disclosure. Other implementations, including methods, computer readable medium having appropriate instructions stored thereon, and other types of embodiments could also be implemented without undue experimentation by those of skill in the art in light of this disclosure. For example, this disclosure could be used to implement a combination comprising a database and a means for cellular message display, where the means for cellular message display is communicatively coupled to the database and configured to display one or more messages stored in the database. Other types of implementations are also possible.

BRIEF DESCRIPTION OF THE DRAWINGS

The drawings and detailed description which follow are intended to be merely illustrative and are not intended to limit the scope of the invention as contemplated by the inventors.

FIGS. 1A-1B depict a board where MyKu are displayed.

FIG. 2 depicts a board showing how a MyKu response can be added.

FIG. 3 depicts an interface used to add a responsive MyKu

FIG. 6 depicts a comment entry interface which can be accessed by selecting an icon.

FIG. 7 depicts a profile access interface.

DETAILED DESCRIPTION

The inventors have conceived of novel technology for facilitating, organizing, and presenting user input. While this technology can be utilized in a number of applications (e.g., comment organization, user generated content sites, ideation on a local system, etc.) for the purpose of illustration an exemplary application in the field of user generated poetry is described herein. These particular user generated poems (referred to herein as MyKu) demonstrate one area in which the inventors' technology can be applied, though it should be understood that the MyKu embodiment described herein does not indicate limits on the potential application of the inventors' discoveries, and that the disclosure herein is illustrative only.

Figure 1B:
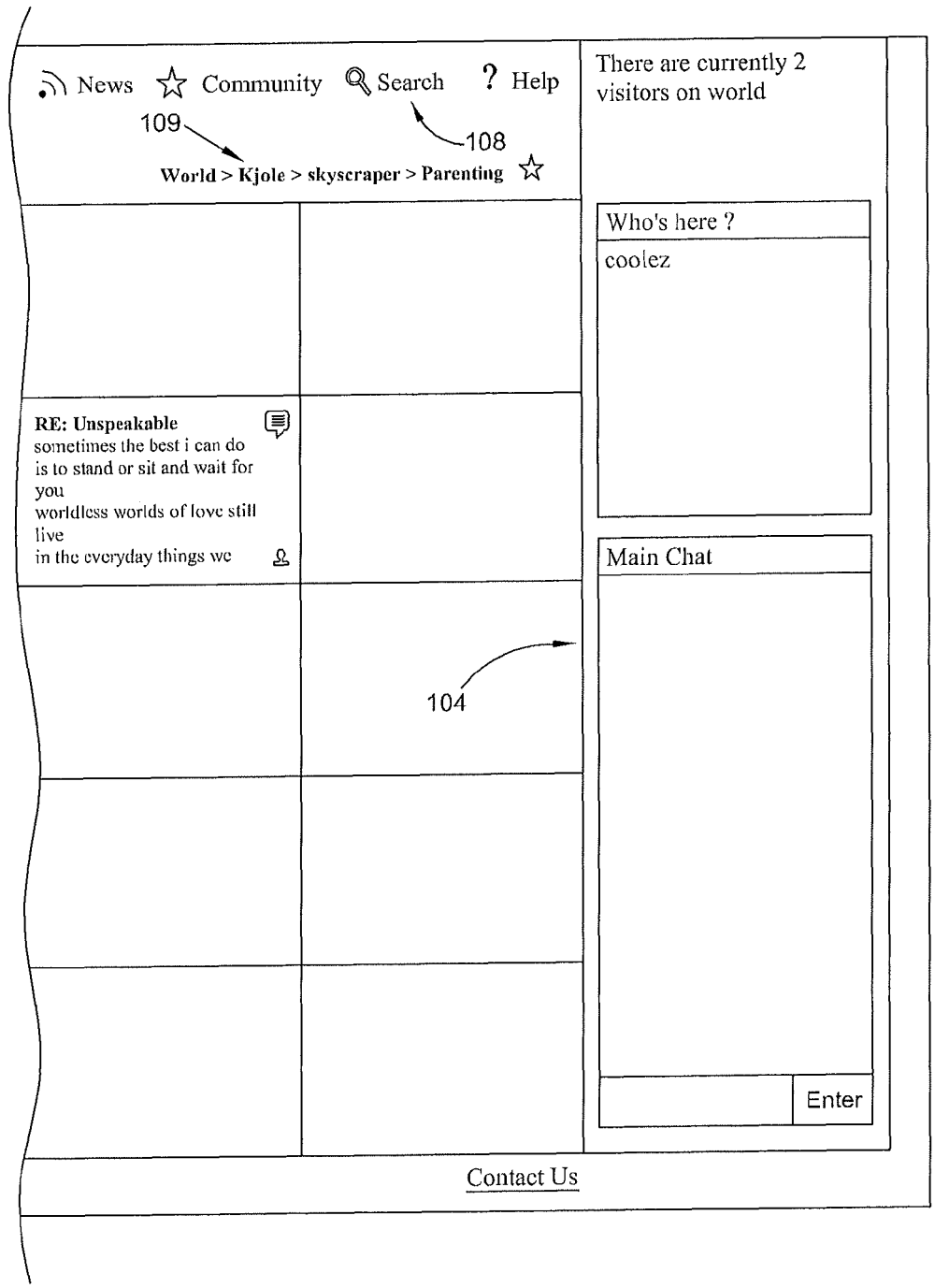

Turning now to the figures, FIGS. 1a-1b depict a board [101] where user MyKu can be displayed. As shown in FIGS. 1a-1b, MyKu can be displayed on a plurality of cells [102]. Also, as shown in FIGS. 1a-1b, the cells [102] where MyKu are displayed can be associated with one another, for example, by path indicators [103] (such as the triangles in the edges and corners of the cells in FIGS. 1a-1b) which show that certain MyKu were put up in response to, or are otherwise related to, other MyKu. In an implementation where cells are associated with each other in terms of whether a MyKu in a cell was added in response to an already existing MyKu, it is possible that a board could be created with the addition of a single MyKu, and subsequent MyKu could be added to the board by responding to an existing MyKu in a cell adjacent to the MyKu which is the subject of the response. For example, the board [101] shown in FIGS. 1a-1b, could have been created by initially entering the initial message [105] shown in the upper left-hand cell. Of course, it should be understood that the teachings of this disclosure could be implemented such that the initial message [105] could be entered into cells other than the top left cell, or could be provided by techniques other than entry by a user. For example, it could be automatically provided as a prompt from a database of pre-existing messages, or generated by a message creation algorithm (e.g., a natural language statement generation algorithm modified with rules on overall length, line length, word placement, etc).

Once an initial message [105] has been added, then the remainder of the board can be filled by adding responsive messages. An example of an interface which can be used to add a responsive message is shown in FIG. 2. In FIG. 2, there is depicted a portion of a board [101], a plurality of occupied cells [201] and a plurality of vacant cells [202]. Using the interface of FIG. 2, to respond to an existing message in one of the occupied cells, a user would select an adjacent vacant cell [203]. Once the adjacent vacant cell [203] is selected (e.g., by clicking, mousing over, or otherwise indicating the cell), the interface could be modified to reflect the selection. For example, in FIG. 2, the adjacent vacant cell [203] is displayed with path indicators indicating each cell adjacent to the selected cell. The user could then select what message (e.g., the messages [204] in the highlighted occupied cell) they wish to respond to by selecting the appropriate path indicator. In FIG. 2, this might be accomplished by first mousing over the path indicator indicating that the user wishes to respond to the message in the upper left adjacent cell (this could cause that cell to be highlighted), then clicking on the path indicator to bring up a message entry interface, such as that shown in FIG. 3. The user could then enter their message into the message form [301] in the message entry interface.

It should be understood that the discussion above is intended to indicate one approach to implementing the teachings of this disclosure, and should not be taken as implying that the inventors' technology is limited to the described approach. As an, example of a variation on the approach described above which could be implemented, instead of responding to an existing message by selecting an adjacent vacant cell, then selecting the message to respond to, the sequence could be reversed, with the user first selecting a message to respond to, then selecting the adjacent vacant cell for the response. Similarly, it is not a requirement to use a separate interface such as that shown in FIG. 3 for message entry, and in some implementations messages could be added in other manners, such as by being entered directly into a cell. Further, not all implementations will restrict users to responding to already existing messages. For example, in some implementations, a user might be able to create a message which doesn't respond to an existing message by selecting a vacant cell and simply adding the new message. Of course, these variations are themselves provided only to illustrate that the inventors' technology is not limited to the embodiments described above, and should not be treated as implying limitations on that technology. Other variations are also possible and will be immediately apparent to those of ordinary skill in the art in light of the explicit disclosure set forth herein.

Figure 4:
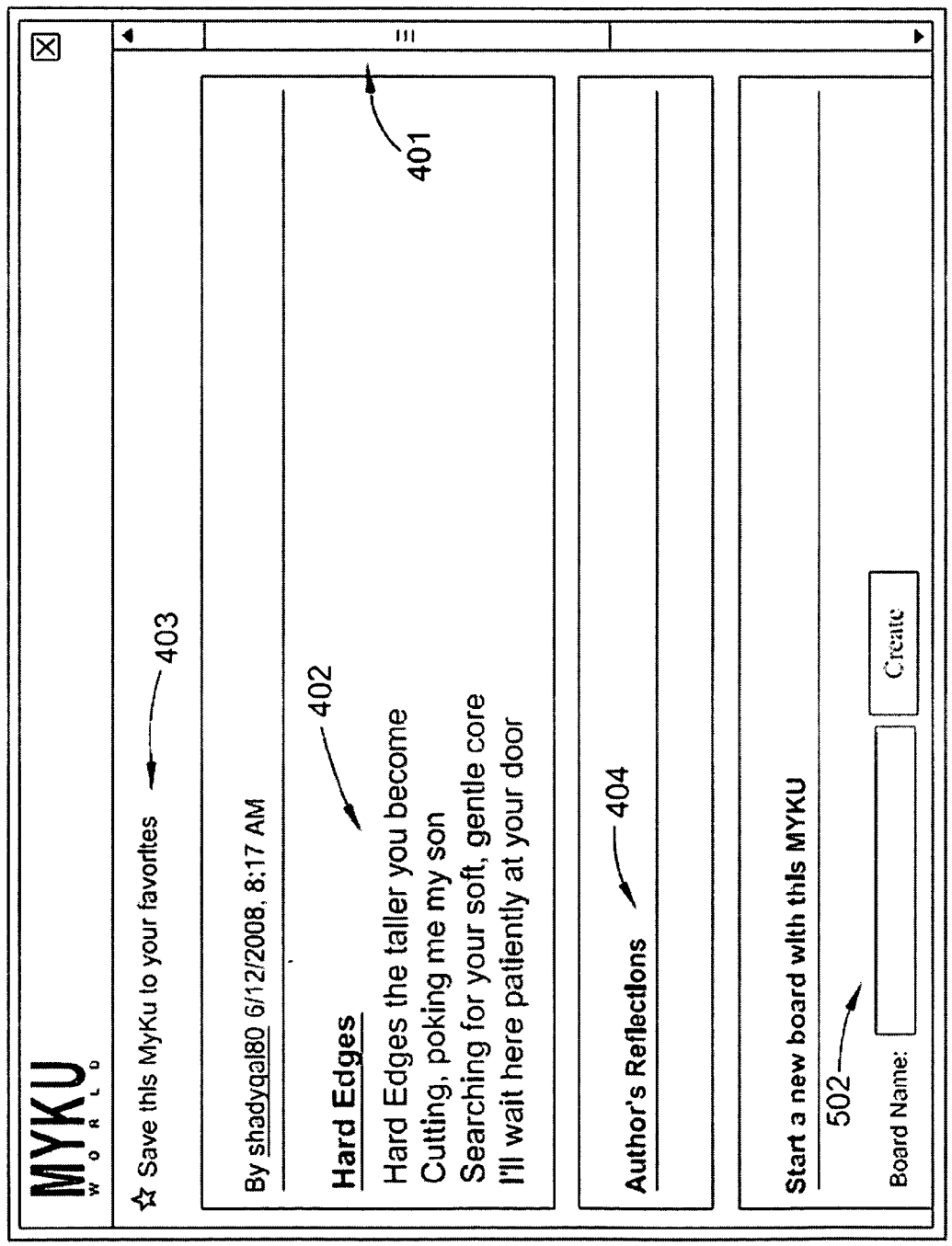
FIG. 4 depicts an interface for accessing more information about a MyKu.
Figure 5:
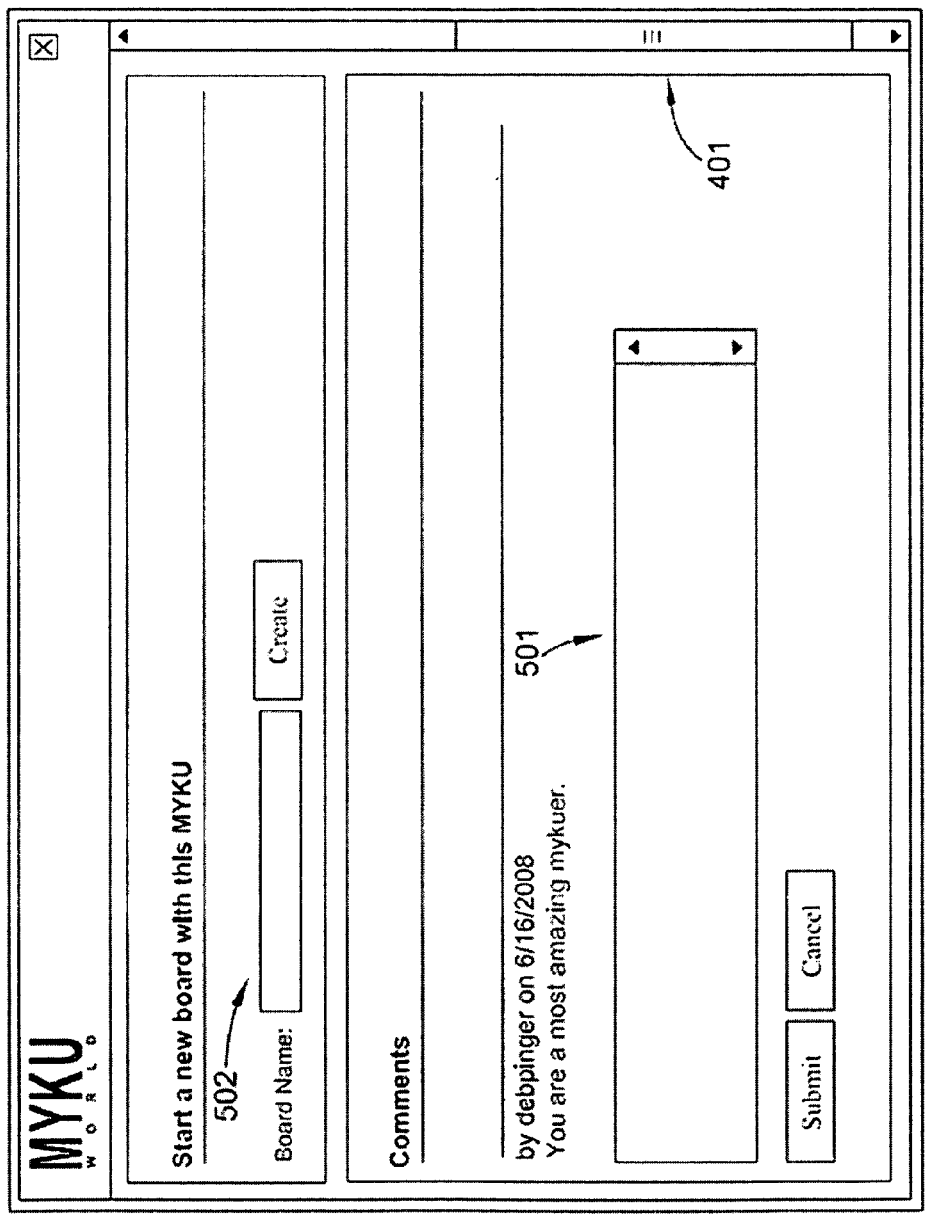
FIG. 5 depicts a comment entry interface which can be accessed by selecting a MyKu.

Continuing with the discussion of FIGS. 1a-1b, it is possible that a board such as shown in those figures could be used as an interface with functionality beyond what is described above. For example, in some cases, in addition to allowing users to add MyKu to a board [101], an interface such as shown in FIGS. 1a-1b could allow a user to obtain additional information about MyKu which are already on the board [101] (e.g., by clicking on an existing MyKu, or on the existing MyKu's title, or otherwise selecting the existing MyKu). An example of such an interface which might allow a user to access additional information regarding a MyKu is shown in FIG. 4. FIG. 4, in addition to showing the text of the selected message [402], the interface of FIG. 4 also presents a user with the option of adding metadata to the messages (i.e., by adding the message to the user's favorites using the favorite indicator [403], though other types of metadata addition, such as commenting, rating or tagging could also be implemented). The interface of FIG. 4 also allows the user to view metadata regarding the message, such as, in the case of FIG. 4, the reflections [404] added by the author of the message, if any. Also, as shown in FIG. 5, an interface such as shown in FIG. 4 could be equipped with a scroll bar [401] that allows a user to access further functionality, such as adding comments to a MyKu (e.g., using a comment form [501]), or starting a new board with the existing MyKu (e.g., using the board creation form [502]).

Figure 6:
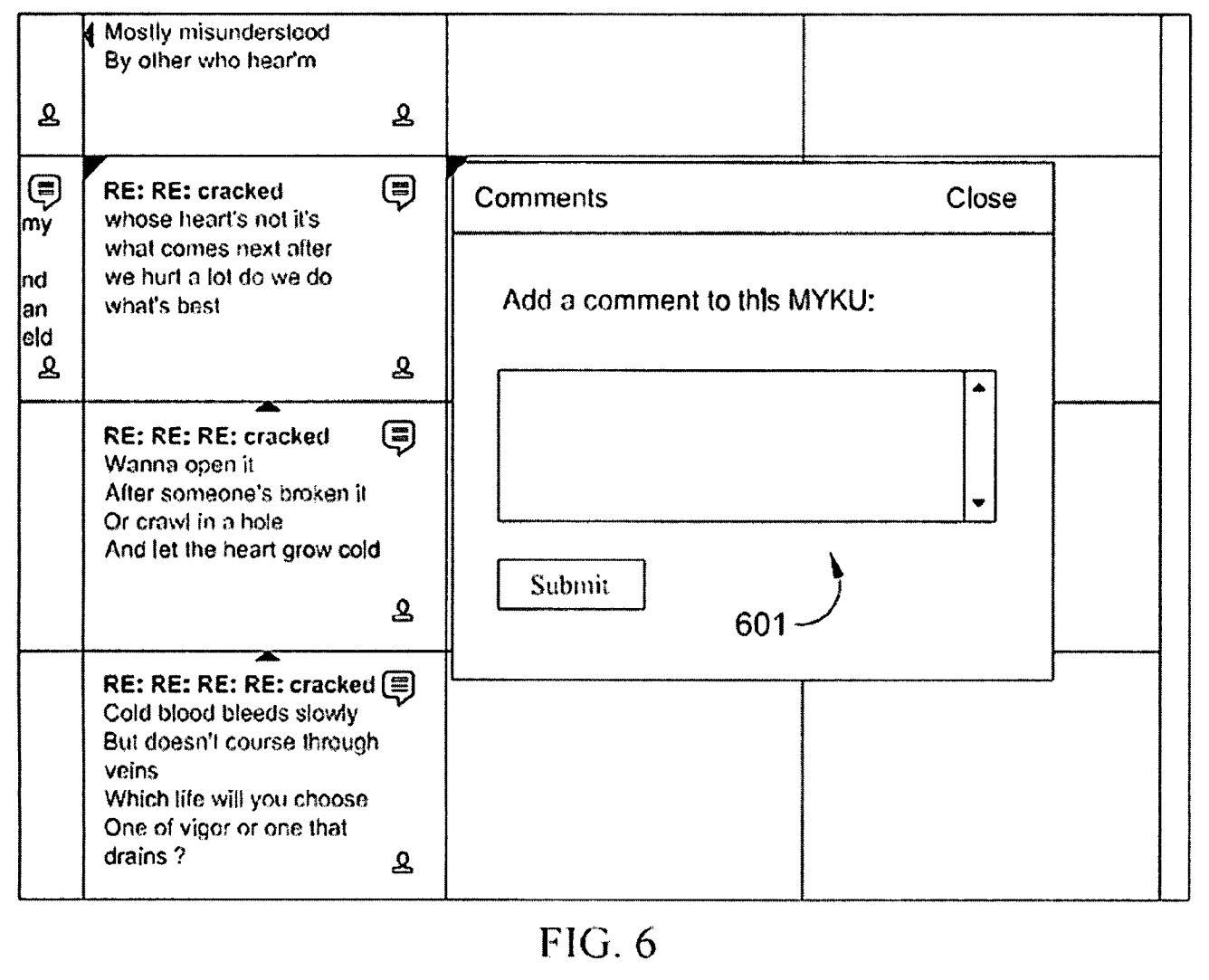
Figure 7:
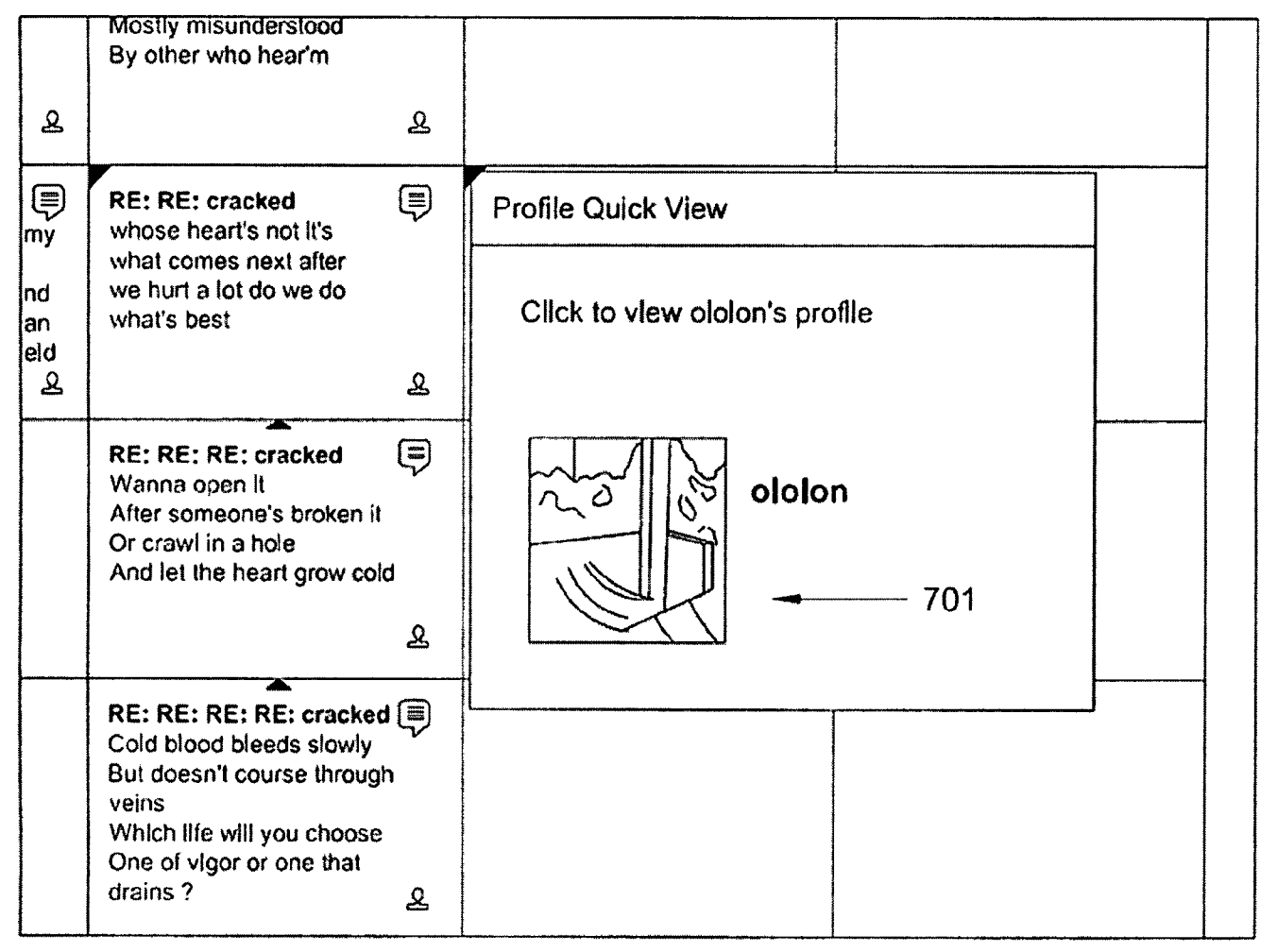

Other functionality for a board [101] such as shown in FIGS. 1a-1b is also possible. For example, in some implementations it might be possible to access a profile of the author of a particular MyKu, or to add comments to a MyKu using a dedicated comment interface by selecting (e.g., by hovering over, or clicking on, etc) icons in a MyKu's cell. As an example of this, FIG. 6 shows an interface with a dedicated comment entry form [601] which might be presented to a user who selects (e.g., by mousing over) the speech bubble icon in a cell such as shown in FIGS. 1a-1b. As a further example, FIG. 7 depicts an interface which could be used to access the profile (e.g., by clicking on the profile picture [701]) for a MyKu author based on selecting (e.g., mousing over) the author icon [107] in the lower right corner of a cell such as in the board of FIGS. 1a-1b. The profile itself could have additional information on the author (e.g., "About Me" information, most recent messages, favorite messages, comments by others on messages, etc) as well as tools which allow other actions, such as contacting the author, or adding the author to a friend list. Of course, it should be understood that the discussion above is intended to be illustrative only, and that it is also possible that the teachings of this disclosure could be implemented by means other than those discussed. For example, in some implementations, a MyKu author profile would be accessed directly by selecting the author icon [107] in a board such as shown in FIGS. 1a-1b, rather than indirectly as shown in FIG. 7.

It should be understood, of course, that not all functionality provided by an interface such as shown in FIGS. 1a-1b is necessarily connected with the depicted cells. For example, in some implementations, it is also possible that users could communicate directly with one another, such as through a chat interface [104], depicted in the right side of FIG. 1b. Additionally, as shown in FIGS. 1a-1b a search tool [108] could provide access to search functionality (e.g., a search engine which could allow users to search/view search results in terms of authors, text, boards, other parameters). Other information which could be accessed through an interface such as shown in FIGS. 1a-1b includes social networking information, such as community information (e.g., a word of the week which could be submitted by community members as a potential prompt for the creation of new messages), or news (e.g., stories on current and/or personal events submitted by users). Also, an interface such as shown in FIGS. 1a-1b could include aspects which allow users to access help information, or a tool [109] which could allow a user to immediately determine where they are in MyKu space (discussed infra).

Figure 8:
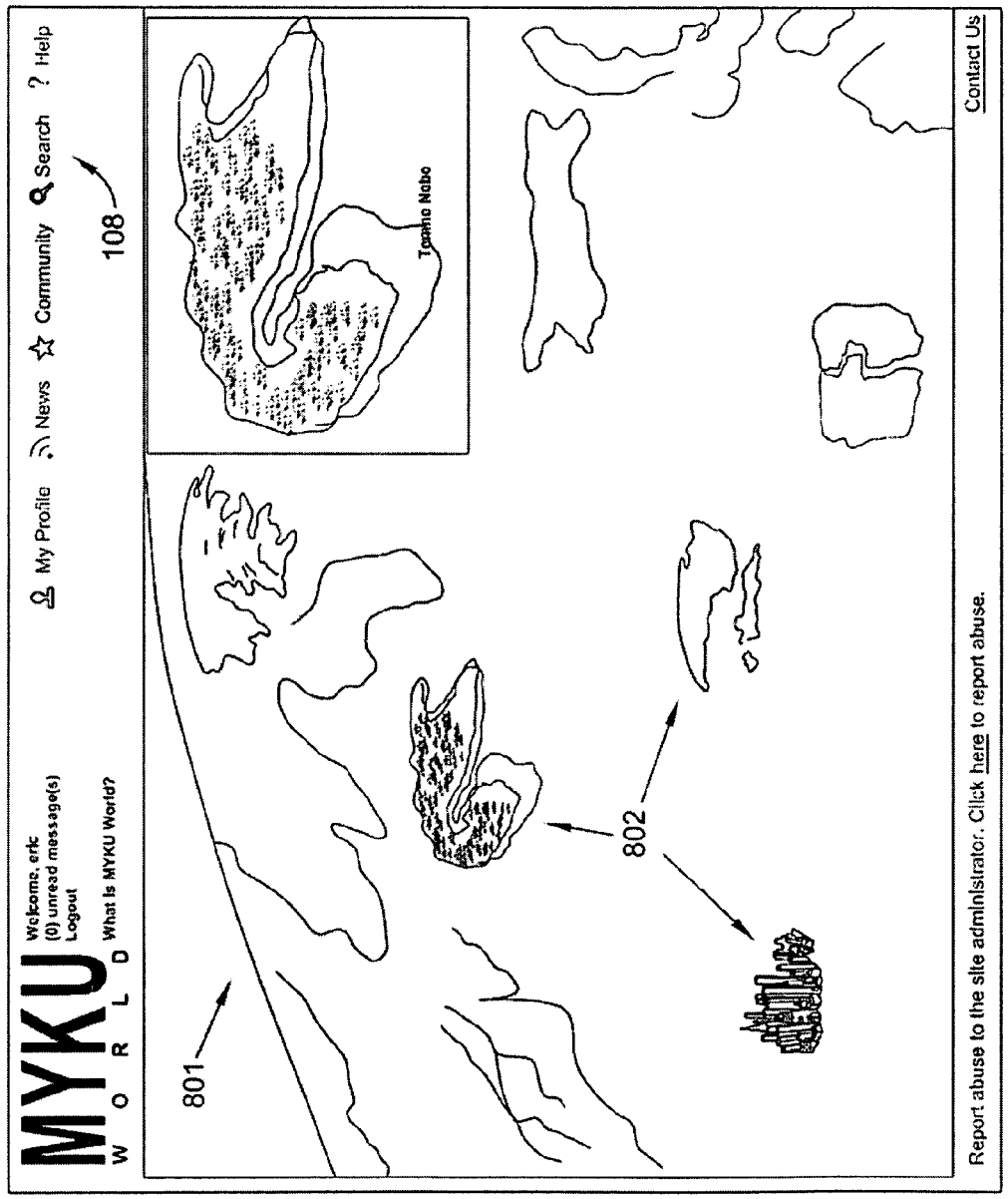
FIG. 8 depicts an interface for a MyKu "world."

Turning now to FIG. 8, that figure depicts a geographic interface which could be used to organize and access MyKu boards and individual MyKu. In the interface of FIG. 8, there is presented a world [801] comprising a set of discrete locations [802] (represented in the interface of FIG. 8 as islands). In some implementations, the locations [802] could be presented to a user based on information in the user's profile. For example, different locations could be presented based on the user's age (e.g., dedicated children's islands), interests (e.g., a soccer island, for users who indicated an interest in sports), or physical location (e.g., there could be a unique island for individuals indicating that they are physically located in the west coast of the United States). Of course, it is also possible that all locations could be presented to all users, or that there might be the same set of locations presented, but with different content depending on information regarding users (e.g., there could be a hobbies island, which might have different content and/or a different appearance based on the user's hobbies). Other variations on the world metaphor, or different approaches to organizing boards and cells (including common file organization schemes, such as folders and directories) could be used. As a result the world metaphor discussed with respect to FIG. 8 should be understood as being illustrative only, and not limiting.

Figure 9:
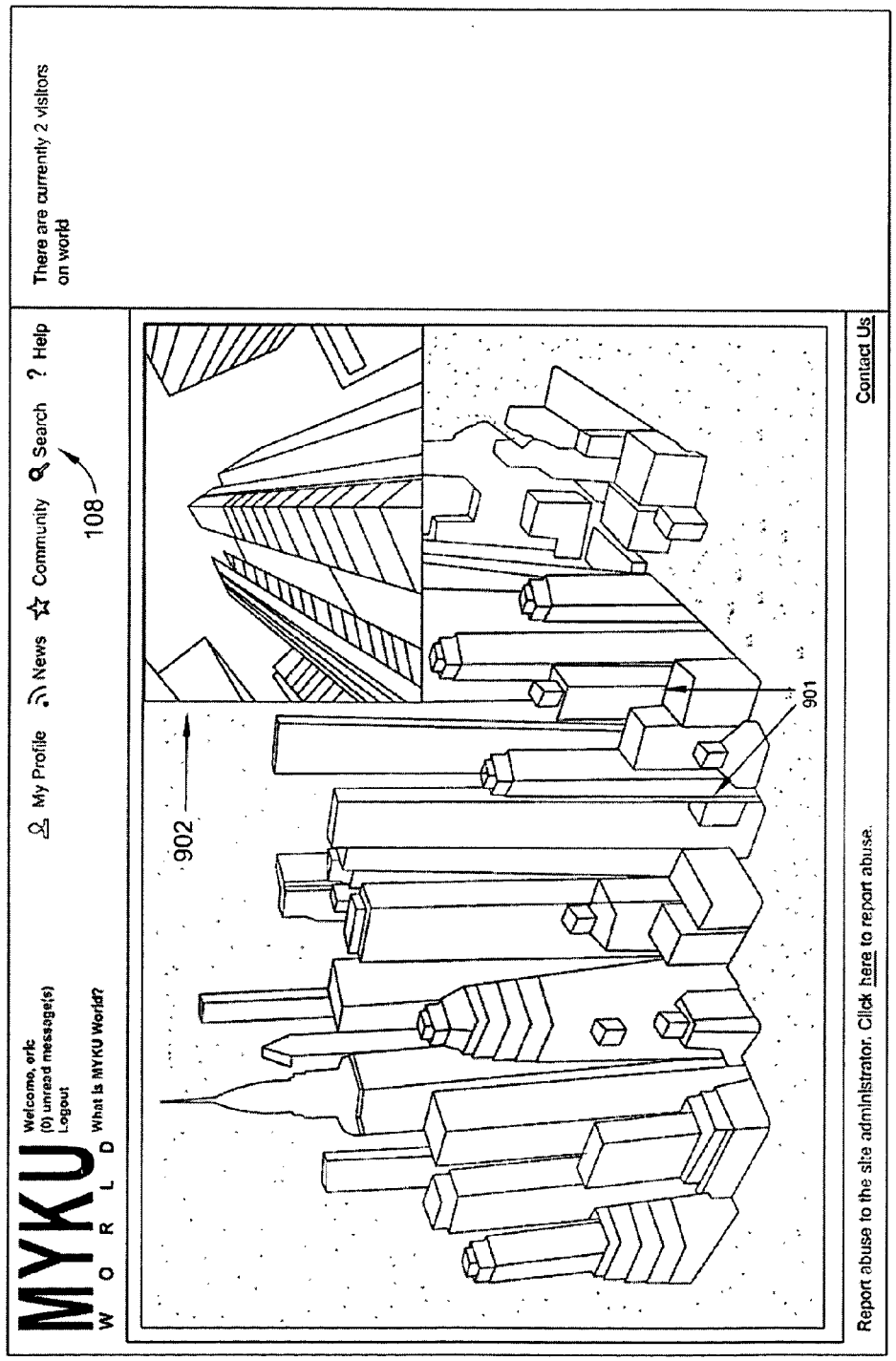
FIG. 9 depicts an interface showing an island in a MyKu world with potential board locations indicated.
Figure 10:
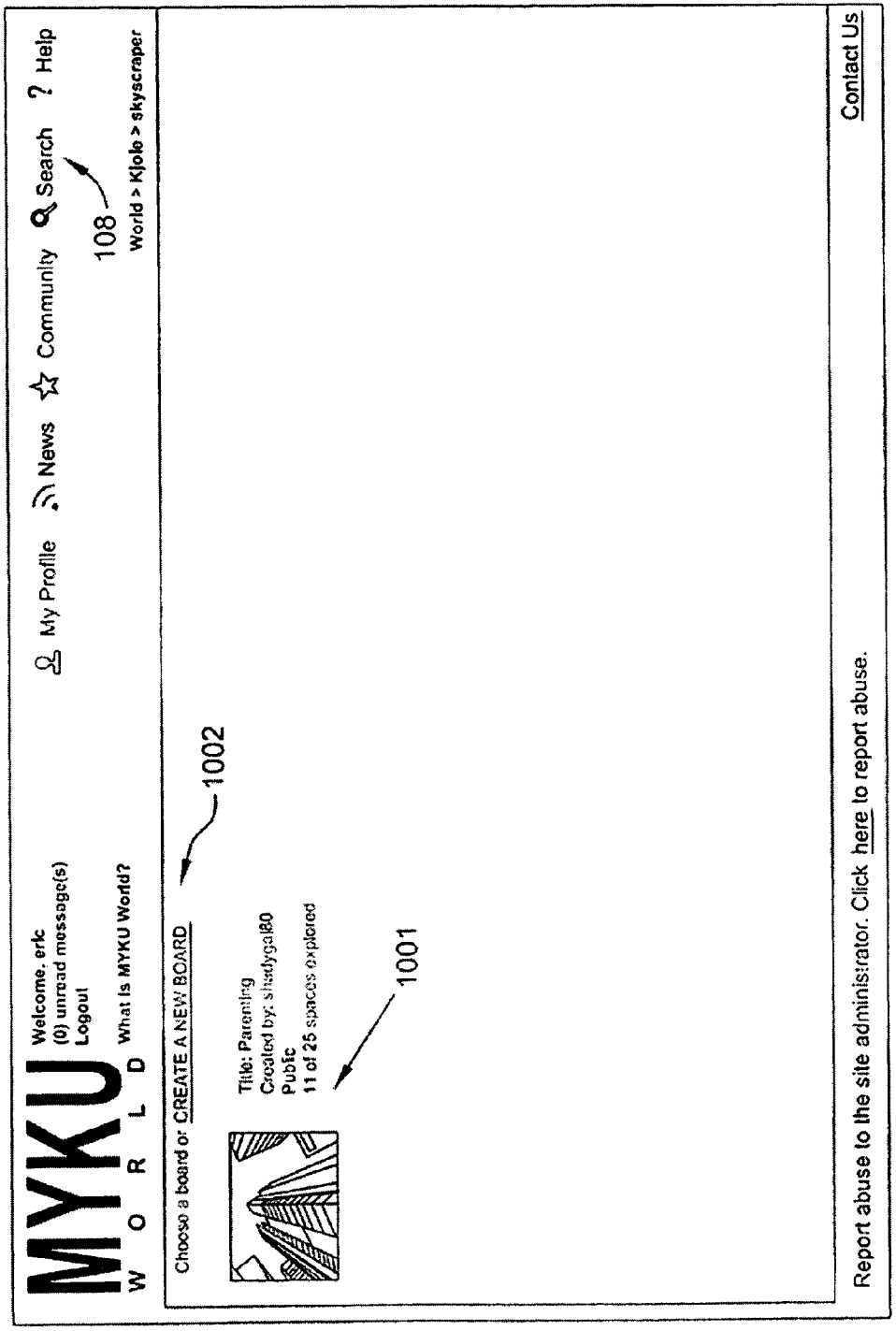
FIG. 10 depicts an interface showing a list of boards which have been started in a location.
Figure 11:
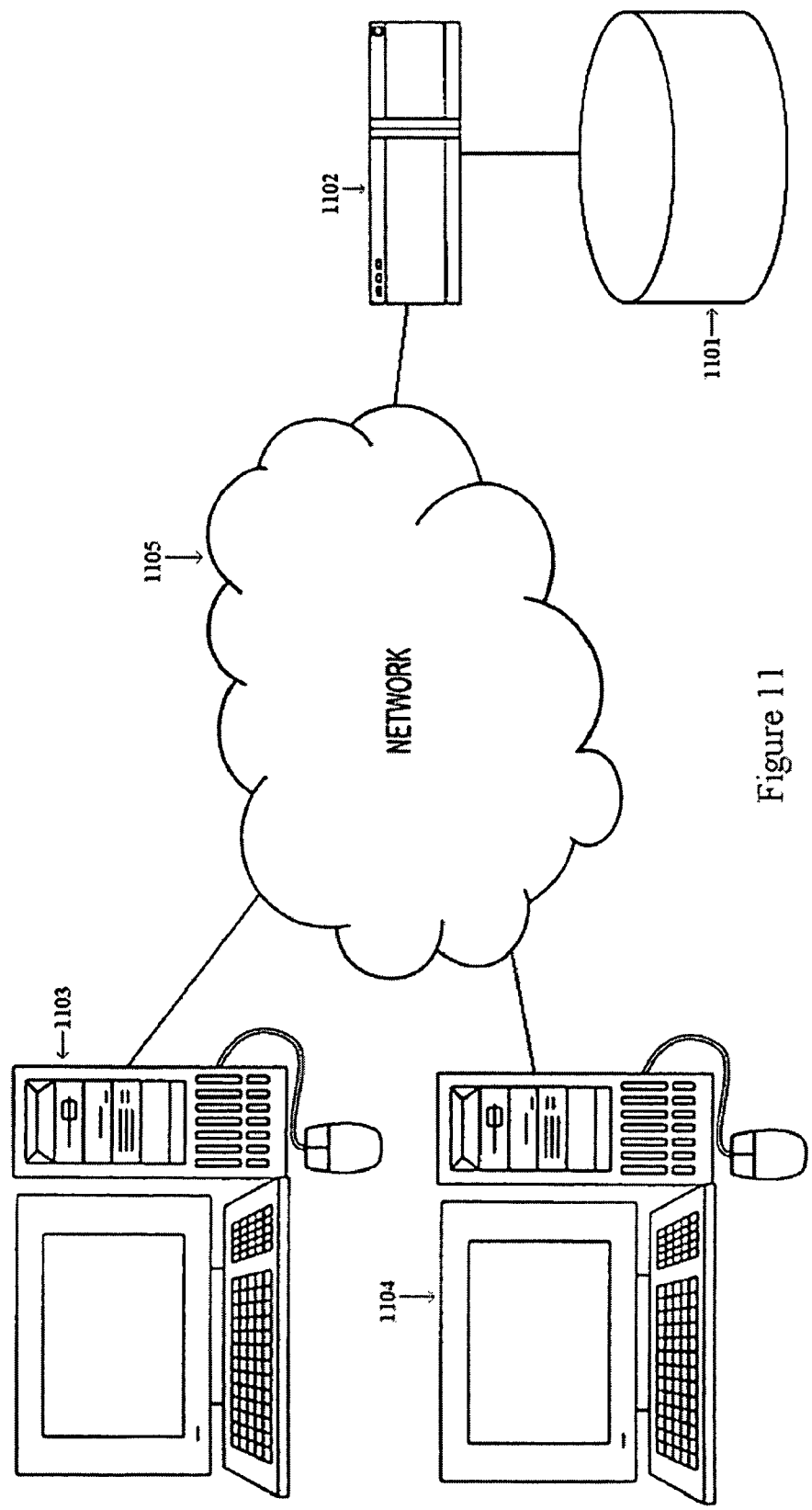
FIG. 11 depicts an exemplary hardware architecture.

Continuing with the discussion of the world metaphor of FIG. 8, FIG. 9 depicts an interface which may be depicted when a user selects one of the discrete locations [802] from FIG. 8. In the interface of FIG. 9, there is depicted a single island, with board settings [901] shown to indicate where boards may be located. In the upper right hand corner of FIG. 9 is a setting preview [902] which can provide information about the "settings" for that island. In an implementation following the world metaphor, these settings could be purely decorative, or they could have some influence on the boards organized into those settings. For example, the background of the boards which are located in the individual settings could reflect the images shown in the setting preview [902], background music reflective of the individual settings could be played with boards located in those settings, or other effects reflective of the settings could be used. Finally, once a user selects one of the settings [901], they could be presented with an interface such as shown in FIG. 10. In the interface of FIG. 10, the user is prompted as to whether he or she wishes to create a new board using [1002] (in which case the user might be presented with an empty board onto which an initial message could be entered, as described previously), or view an existing board by selecting one of the boards [1001] which had already been created in that setting (in which case the user could be presented with a board and add responsive messages, as discussed previously):

As will be apparent to those of ordinary skill in the art, because the technology disclosed herein can be applied to a variety of uses, there are a variety of underlying hardware architectures which can be used to implement the approaches described above. As an example of one architecture which could be used in implementing certain aspects of this disclosure, consider the diagram of FIG. 11. In the diagram of FIG. 11, there is depicted a database connected to a server [1102], which is itself connected to a plurality of client computers [1103][1104] (represented by two computers in FIG. 11, though, of course, additional client computers could be included in such an architecture) by a network [1105] (e.g., the Internet). In operation, an architecture such as shown in FIG. 11 could operate by the client computers [1103][1104] connecting to the server [1102] via the network [1105]. The server [1102] could then send information to the client computers [1103][1104] to display interfaces such as discussed above with respect to FIGS. 1-10. In some implementations, a portion of that information might be taken from the database [1101] which could be used to store messages (e.g., MyKu) which had previously been entered either on the user computers [1103][1104] or by other means (e.g., other user computers, handheld devices, automatic generation, etc). The user computers [1103][1104] could then be used to, for example, create new messages, which could be transmitted to and stored in the database [1101] via the network [1105] and the server [1102].

Of course, the architecture described above is simply one architecture, and others are possible. For example, in some architectures, the server computer and the database [1101] might be combined, so that the messages would be stored on the server computer [1102] itself (e.g., in a local hard drive) rather than on a separate machine. Similarly, in some implementations, the server computer [1102] might not be separate from the computers (e.g., client computers [1103][1104]) operated by users. For example, in a case where interfaces such as described previously in the context of FIGS. 1-10 are used in brainstorming or ideation software, the functionalities of the server [1102], and the database [1101] could be incorporated into, and accessed locally on, the user computers [1103][1104]. Other architectures, for example, where the server [1102] functionality is incorporated into the user computers [1103][1104] and a remote database [1101] is accessed via network [1105], or where the user computers [1103][1104] interact directly with one another in a peer to peer configuration are also possible. Accordingly, the discussion of architectures above should be understood as being illustrative only, and not limiting.

The computer program appendix filed herewith and incorporated by reference in its entirety contains code which can be used to configure a computer to interact with a database, and to present interfaces such as shown in the figures to a user. The SQL file on the computer program appendix sets forth instructions which can be used to create a database which could be populated with poems using techniques such as described herein. The source files in the computer program appendix set forth computer source code instructions which can be used to program a computer to provide interfaces and perform database interaction functions in support of applications such as described herein.

While the above discussion focused on implementations in which text messages are added to cells in a board organized into a two dimensional matrix having rows and columns, it should be understood that the disclosure set forth herein is not limited to being implemented in the manners explicitly described. For example, boards other than those using quadrilateral cells organized into rows and columns (e.g., hex grid boards) could be used, and the messages added to those boards might not be text messages, but might also include video, audio, pictures, and interactive media (e.g., games and/or applets). Accordingly, instead of limiting the protection accorded by this document, or by any document which is related to this document to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When used in the claims, "board" should be understood to mean a perceptible surface or space having at least two dimensions (e.g., height and width). It should be understood that a "board" is not limited to rectangular or quadrilateral boards such as described, and that other types of boards such as cubic boards (i.e., boards which define a cubic volume) or spherical boards (i.e., boards which define a spherical volume) are also possible.

When used in the claims, "cardinality" should be understood to mean the number of elements in a set. For example, the "cardinality" of the set of all integers between one and three (inclusive) is three.

When used in the claims, "cell" should be understood to refer to a definite portion of a larger surface or space (e.g., a location on a board).

When used in the claims, "communicatively coupled" should be understood to refer to a relationship between devices or components in which the devices are capable of, either directly or indirectly, transferring information to and receiving information from one another.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "database" should be understood to a collection of data stored on a computer readable medium in a manner such that the data can be retrieved by a computer. The term "database" can also be used to refer to the computer readable medium itself (e.g., a physical object which stores the data).

When used in the claims, "dimension" should be understood to refer to a measurable property of a space. For example, a line where points on the line can be located based on length measurements would have one "dimension" (length) while a surface where points on the surface could be located based on length and height measurements would have two "dimensions" (length and height).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set." For example, each "message" (defined infra) in a "set of messages" would be an "element" of the "set."

When used in the claims, an "injective function" should be understood to refer to a one to one function which associates each argument in a domain with one (and only one) unique value in a range. To illustrate, the statement that each message from a set of messages is associated with a cell from a set of cells implies that each message from the set of messages is associated with only one cell, and that no cell in the set of cells is associated with more than one message (though some cells may be associated with zero messages, if the sets have different cardinalities). It should be understood that, while the term "function" is often used to refer to named programming procedures that provide specific services, the use of the term "injective function" does not mean that there is a named procedure or data that reflects the association performed by the "injective function." Rather, it refers to the association itself, even though a specific "function" (in the named procedure sense) defining or encoding that association may not have been created.

When used in the claims, a "matrix" should be understood to mean an array of cells (which may or may not contain values) where each of the cells can be transformed into any other cell in the "matrix" by a translation without rotation, scaling, or any other type of transformation other than a change in position. An example of a "matrix" having two dimensions is a spreadsheet, which is separated into rectangular cells organized into rows and columns.

When used in the claims, a "means for cellular message display" means the structure, material or acts which are disclosed herein for performing the function of "cellular message display," and their equivalents. The function of "cellular message display" is the act (or acts) of displaying one or more messages displayed in cells, as that term is explicitly defined herein. The interfaces discussed in relation to FIGS. 1a-1b are an examples of "means for cellular message display," though, of course, the "means for cellular message display" is not limited to the particular interfaces in FIGS. 1a-1b and the related discussion.

When used in the claims, a "means for cellular message entry" means the structure, material or acts which are disclosed herein for performing the function of "cellular message entry," and their equivalents. The function of "cellular message entry" is the act (or acts) of allowing a user to provide a message which will be associated with a particular cell, as that term is explicitly defined herein, in which the message is entered. The interfaces discussed with relation to entering a new message and shown in FIG. 2 are examples of "means for cellular message entry," though it should be understood that the "means for cellular message entry" is not limited to the particular interfaces of FIG. 2 and the discussion of entering messages set forth explicitly in the disclosure.

When used in the claims, a "means for entering metadata" means the structure, materials or acts which are disclosed herein for performing the function of "entering metadata," and their equivalents. The function of "entering metadata" should be understood to refer to the act (or acts) of providing data which is descriptive of, or provides meaning or context for, other data. The interfaces of FIG. 4, and the associated discussion, are examples of "means for entering metadata," though it should be understood that the "means for entering metadata" is not limited to the particular interfaces of FIG. 4 and the associated discussion.

When used in the claims, a "message" should be understood to mean data which is expressed in a perceptible (e.g., text displayed on a screen) or partially perceptible (e.g., a still image taken from a larger video) form. Examples of messages include text, video, audio, pictures, and interactive media (e.g., games and/or applets).

When used in the claims, "remote" should be understood to refer to the relationship between entities which are physically distant from one another, such as between entities that communicate over a network.

When used in the claims, a "set" should be understood to refer to a number, group, or combination of zero or more things of similar nature, design, or function.

When used in the claims, a "tessellation" should be understood to refer to a set of elements which fills a surface or space with no gaps or overlaps. As an illustration, to say that a set cells is a "tessellation" of a board means that the entirety of the board is occupied by the cells.

When used in the claims, a "text" message should be understood to refer to a message that consists of text.

Accordingly, we claim:

1. A computer including a processor and a memory, the computer programmed to perform a set of steps comprising:
   (a) displaying a board comprising a set of cells, wherein the set of cells is a tessellation of the board;
   (b) displaying a set of messages, wherein each message is associated with a cell by an injective function from the set of messages to the set of cells, and wherein each message is displayed in the associated cell;
   (c) allowing a user to select a cell from the set of cells, wherein, if cardinality of the set of messages is greater than zero, the selected cell must meet the following conditions:
      (i) a first statement that there exists a cell from the set of cells which is adjacent to the selected cell and which is associated with a message from the set of messages by the injective function is true; and
      (ii) a second statement that there exists a message from the set of messages which is associated with the selected cell by the injective function is false;
   (d) allowing the user to add an element to the set of messages by entering a new message for the selected cell, wherein the new message is associated with the selected cell by the injective function, and wherein, if the cardinality of the set of messages is greater than one after entry of the new message, the new message is responsive to an existing message associated with a cell adjacent to the selected cell by the injective function; and
   (e) displaying, in each cell associated by the injective function with a message entered into a selected cell after the cardinality of the set of messages was greater than zero, a path indicator indicating the message to which the message entered into the selected cell after the cardinality of the set of messages was greater than zero is responsive.

2. The computer of claim 1, wherein allowing the user to select a cell from the set of cells comprises allowing the user to:
   (a) indicate a cell adjacent to the selected cell on the board; and
   (b) subsequently indicate the selected cell.

3. The computer of claim 1, wherein the set of steps comprises allowing the user to select a message from the set of messages.

4. The computer of claim 3, wherein:
   (a) the set of steps comprises creating a second board comprising a second set of cells in response to the selection of the message from the set of messages; and
   (b) the selected message is associated with a cell from the second set of cells by a second injective function.

5. The computer of claim 3, wherein the set of steps comprises allowing the user to comment on the selected message.

6. The computer of claim 3, wherein, in response to the selection of the message, the computer displays a set of information comprising the user who entered the selected message.

7. A computer including a processor and a memory, the computer programmed to perform a set of steps comprising:
   (a) displaying:
      (i) a board, wherein the board comprises a plurality of cells organized in a matrix having at least two dimensions; and
      (ii) one or more messages, comprising an initial message and zero or more subsequent messages;
   (b) allowing a user to:
      (i) select a vacant cell which is adjacent to an occupied cell, wherein occupied cell means cell in which a message is displayed when the board is displayed, and wherein vacant cell means cell in which no message is displayed when the board is displayed; and
      (ii) enter a subsequent message responding to the message in the occupied cell by entering the message in the selected vacant cell;
   wherein:
      (i) each message from the one or more messages is displayed in a cell on the board;
      (ii) the initial message is the first message to have been displayed on the board;
      (iii) the one or more subsequent messages are messages entered into selected vacant cells after the initial messages was displayed; and
      (iv) in each cell in which a subsequent message is displayed, there is a path indicator indicating the message which the subsequent message was entered in response to.

8. The computer of claim 7, wherein the computer is further programmed to restrict the user from entering a message into a vacant cell which is not adjacent to an occupied cell.

9. The computer of claim 7, wherein the one or more subsequent messages comprises a first message entered by a first user and a second message entered by a second user.

10. The computer of claim 7, wherein the one or more messages comprises a text message.

11. The computer of claim 7, wherein the computer is programmed to display the board and the one or more messages, and to allow users to select vacant cells and enter subsequent messages remotely over a network.

12. The computer of claim 7, wherein the board has set, finite boundaries.

* * * * *